Jan. 23, 1962  S. A. MRENNA ETAL  3,018,464
TERMINAL BLOCK
Filed Sept. 15, 1959  6 Sheets-Sheet 1

WITNESSES
John E. Healy Jr.
James F. Young

INVENTORS
Stephen A. Mrenna &
Donald G. Portman
BY
ATTORNEY

Jan. 23, 1962 S. A. MRENNA ET AL 3,018,464
TERMINAL BLOCK
Filed Sept. 15, 1959 6 Sheets-Sheet 2

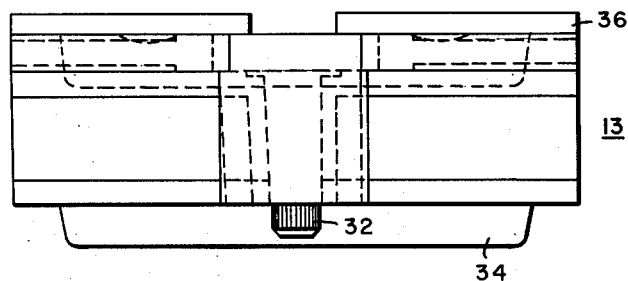
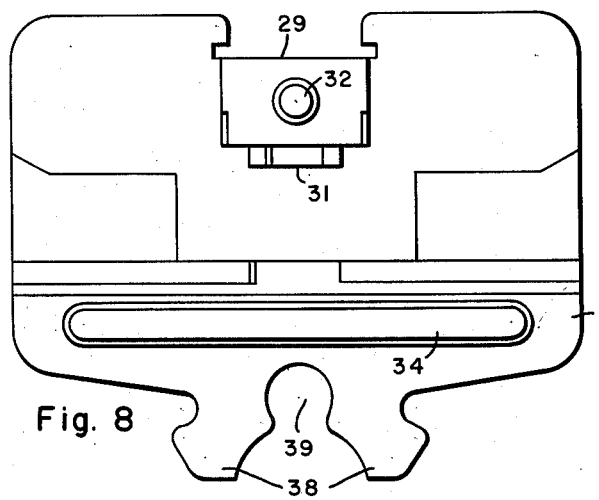
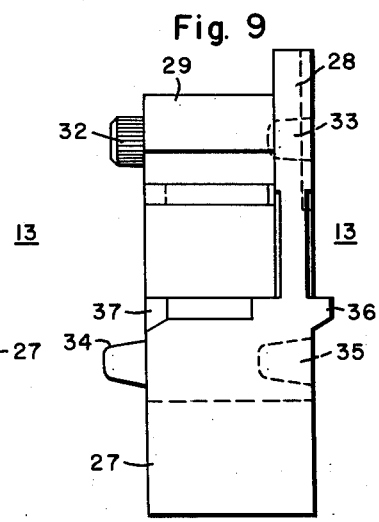
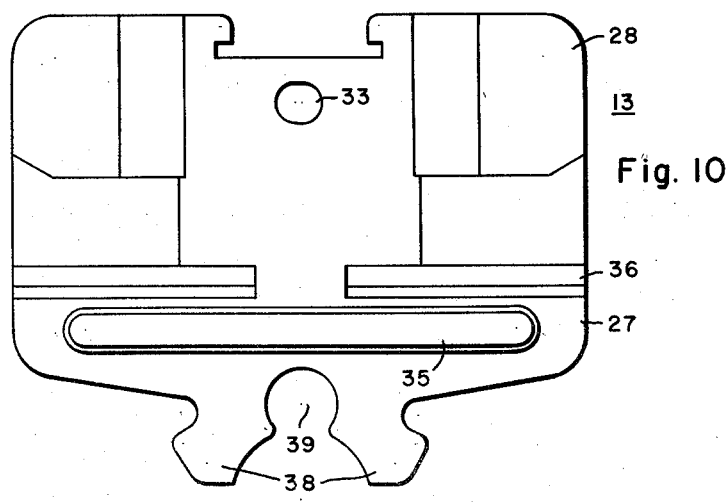

Jan. 23, 1962 S. A. MRENNA ET AL 3,018,464
TERMINAL BLOCK
Filed Sept. 15, 1959 6 Sheets-Sheet 4

Jan. 23, 1962   S. A. MRENNA ET AL   3,018,464
TERMINAL BLOCK
Filed Sept. 15, 1959   6 Sheets—Sheet 5

Jan. 23, 1962    S. A. MRENNA ETAL    3,018,464
TERMINAL BLOCK

Filed Sept. 15, 1959    6 Sheets-Sheet 6

United States Patent Office 3,018,464
Patented Jan. 23, 1962

3,018,464
TERMINAL BLOCK
Stephen A. Mrenna and Donald G. Portman, both of Brighton Township, Beaver County, Pa., assignors to Westinghouse Electric Corporation, East Pittsburgh, Pa., a corporation of Pennsylvania
Filed Sept. 15, 1959, Ser. No. 840,118
4 Claims. (Cl. 339—198)

This invention relates, generally, to terminal blocks and, more particularly, to multiple terminal blocks suitable for utilization in switchgear and control apparatus.

An object of the invention is to provide a multiple terminal block assembly in which each section may be removed from the assembly individually.

Another object of the invention is to provide a multiple terminal block assembly in which the individual sections are interlocked with each other to retain them in position.

A further object of the invention is to provide terminal block sections which may be mounted either in a generally channel-shaped member or on a supporting rod.

Still another object of the invention is to provide a terminal block section with which terminal members of different types may be utilized.

A still further object of the invention is to provide a terminal member for a terminal block to which terminal connectors of different types may be attached at the same time.

Other objects of the invention will be explained fully hereinafter or will be apparent to those skilled in the art.

In accordance with one embodiment of the invention, each section of a multiple terminal block assembly is provided with spaced projections which releasably engage either a generally channel-shaped supporting member or a rod. The sections are retained in assembled relation by end blocks which may be clamped to the channel member or held on the rod by nuts. Generally U-shaped terminal members may be provided on the sections to receive terminal connectors of different types, thereby facilitating the connecting of wires to the terminal block.

For a better understanding of the nature and objects of the invention, reference may be had to the following detailed description, taken in conjunction with the accompanying drawings, in which:

FIG. 7 is a view, in top plan, of one of the terminal block sections of the terminal block assembly;

FIG. 8 is a view in front elevation of the terminal block section;

FIG. 9 is a view in end elevation of the terminal block section;

FIG. 10 is a view in rear elevation of the terminal block section;

Figure 1:
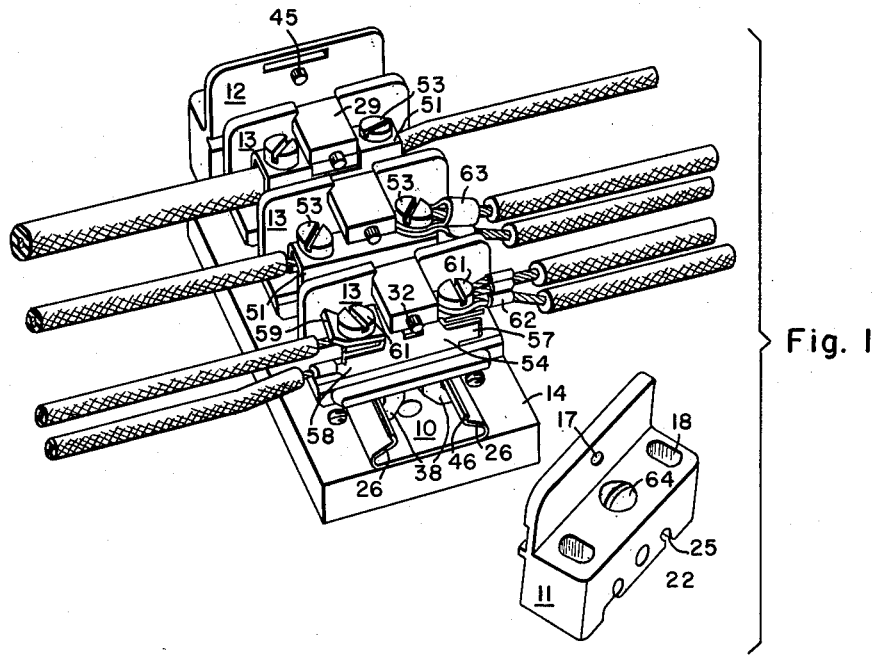
FIGURE 1 is a view in perspective of a terminal block assembly embodying the principal features of the invention.
Figure 23:
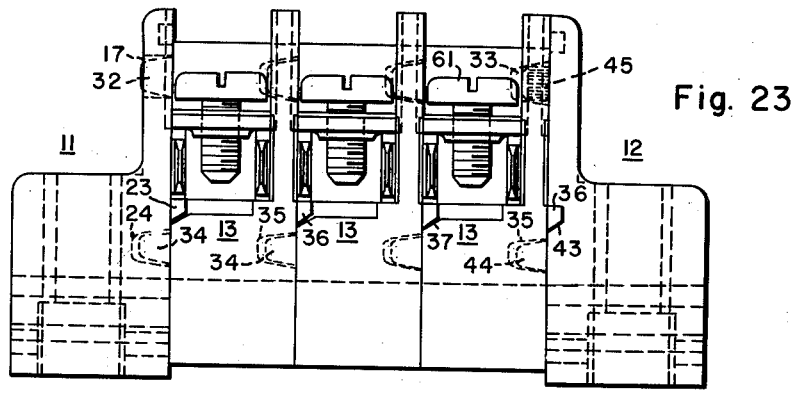
FIGS. 23, 24 and 25 are views in side elevation, plan and end elevation, respectively, of the terminal block assembly.
Figure 24:
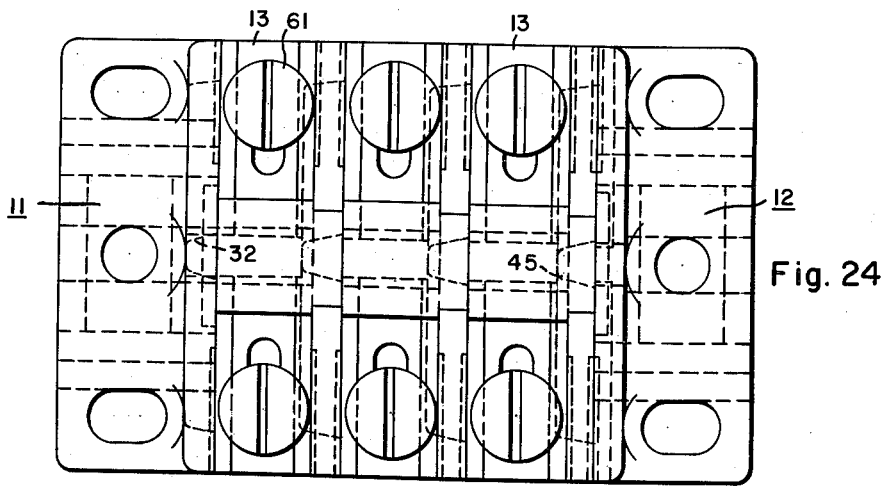

Referring to the drawings, and particularly to FIGURE 1, the multiple terminal block shown therein comprises a generally channel-shaped metal supporting member 10, a left-hand end block 11, a right-hand end block 12 and a plurality of terminal block sections 13 which are normally disposed between the end blocks 11 and 12. The supporting member 10 may be attached to a base 14 or other suitable supporting structure, such as a switchboard panel. As shown in FIG. 1, the terminal block sections are in an exploded or disassembled relation. It will be understood that the terminal block sections are normally assembled in side-by-side relation as shown in FIG. 23 and FIG. 24.

Figure 2:
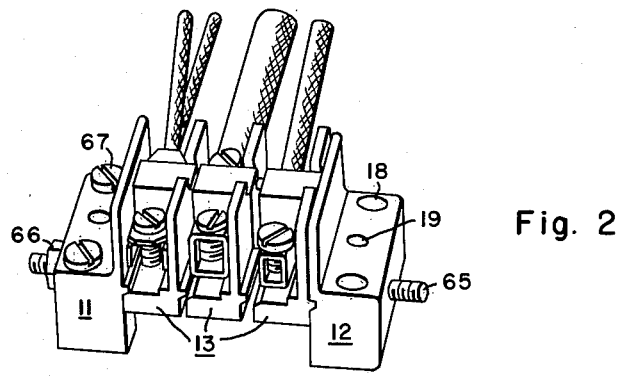
FIG. 2 is a view in perspective of the assembly with a modified supporting member.
Figure 3:
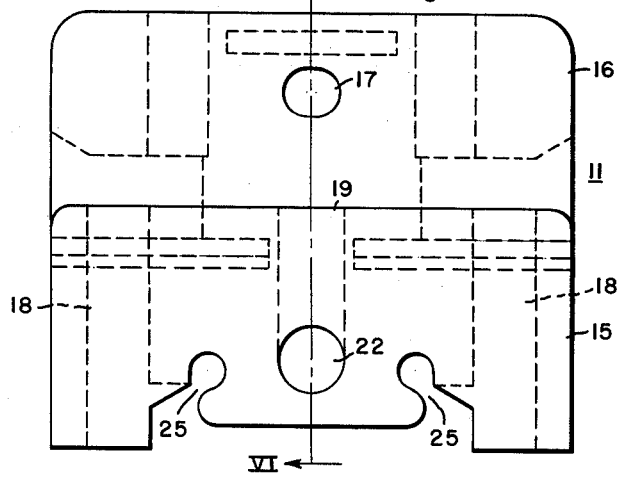
FIG. 3 is a view in front elevation of a left-hand end block for the multiple terminal block assembly.
Figure 4:
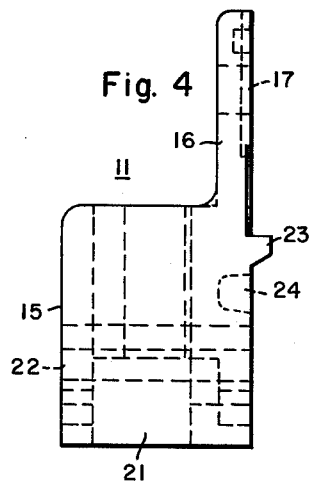
FIG. 4 is a view in end elevation of the end block.
Figure 5:
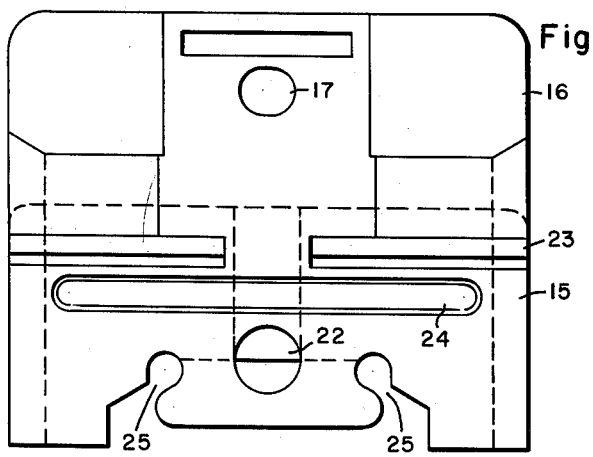
FIG. 5 is a view in rear elevation of the end block.
Figure 6:
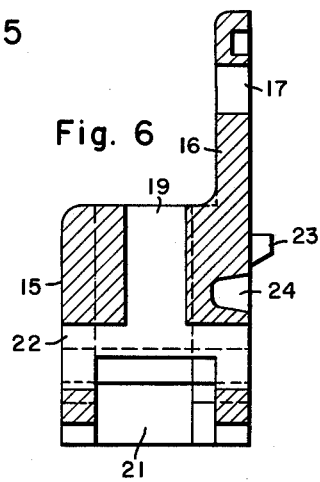
FIG. 6 is a view in section taken along the line VI—VI in FIG. 3.

As shown more clearly in FIGS. 3–6, inclusive, the left-hand end block 11 comprises a base portion 15 and an integrally formed barrier 16 which is perpendicular to the base 15. The blocks may be composed of an insulating material which is suitable for molding. A horizontal opening 17 extends through the barrier 16 for receiving an interlocking projection on a terminal block section. Vertical openings 18 extend through the base adjacent the ends of the base for receiving screws for mounting the block in the manner shown in FIG. 2. As shown most clearly in FIG. 6, a centrally disposed vertical opening 19 extends from the top of the base to a recess 21 in the bottom of the base for receiving a screw for mounting the block in the manner shown in FIG. 25. A centrally disposed horizontal opening 22 extends from the front to the rear of the base for receiving a supporting bolt as shown in FIG. 2. A horizontal projection 23 is provided on the rear of the base. A horizontal recess 24 is also provided at the rear of the base below the projection 23. Two spaced grooves 25 are provided in the base for receiving sides 26 of the channel-shaped supporting member 10.

As shown in FIGS. 7–10, inclusive, each terminal block section 13 comprises a base 27 and an integrally formed barrier portion 28 which is perpendicular to the base 27. A shelf 29 extends from the barrier 28 parallel to the base 27 and is spaced from the base. A downwardly extending projection 31 is provided on the shelf 29. A round horizontally extending projection 32 is also provided on the shelf 29. A recess 33 is provided in the barrier 28 in alignment with the projection 32. An elongated horizontally extending projection 34 is provided on the front of the base 27. An elongated recess 35 is provided at the rear of the base 27 in alignment with the projection 34. An elongated horizontally extending projection 36 is provided at the rear of the base. A recess 37 similar in shape to the projection 36 is provided at the front of the base in alignment with the projection 36. Two spaced downwardly extending projections 38 are provided on the base 27. A recess 39 is provided between the projections 38. The function of the recesses and the projections will be explained more fully hereinafter.

As shown in FIGS. 11–14, inclusive, the right-hand end block 12 is generally similar to a left-hand end block 11. A block 12 comprises a base 41 and a barrier portion 42 which is perpendicular to the base. A horizontally extending recess 43 is provided in the base and the horizontally extending projection 44 is provided below the recess 43. A round projection 45 is provided on the barrier 42. Vertical openings 18 and 19 are provided in the base 41 in the same manner as in the base 15 of the left-hand end block. A horizontal opening 22 is also provided in the base 41. Two spaced recesses 25 are also provided in the base 41.

Figure 15:
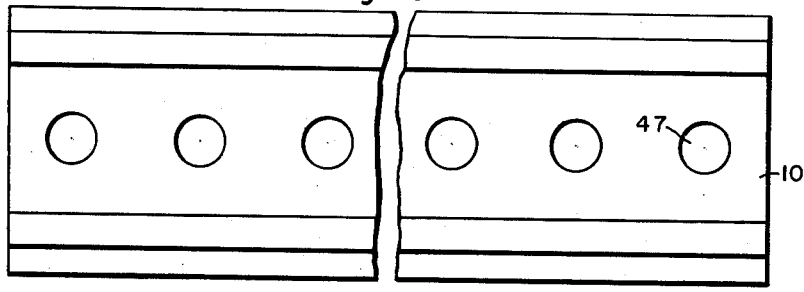
FIGS. 15 and 16 are views in plan and end elevation, respectively, of a supporting member for the terminal blocks and the end blocks of the assembly.
Figure 16:
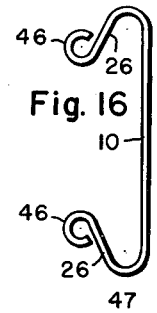

As shown most clearly in FIGS. 15 and 16, the sides 26 of the supporting member 10 are disposed at an acute angle with the base of the generally channel-shaped member. Each side 26 has a curved edge 46. As will be explained more fully hereinafter, the edges 46 are engaged by the projections 38 on the terminal block sections 13 when they are assembled on the supporting member 10. A plurality of holes 47 are provided in the member 10 for attaching the member to a supporting structure. The member 10 is preferably composed of sheet steel or other suitable material.

Figure 17:
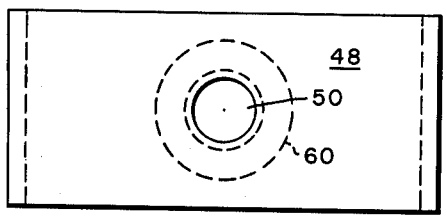
FIGS. 17 and 18 are views in plan and end elevation, respectively, of a clamp for holding the end blocks on the supporting member.
Figure 18:
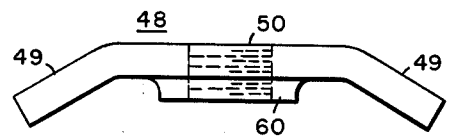

A clamp 48 is provided for attaching each end block to the supporting member 10. As shown in FIGS. 17 and 18, the clamp 48 has angularly disposed sides 49 and a centrally disposed threaded opening 50 which extends through a boss 60 on the clamp. The opening 50 receives a screw 64 for drawing the clamp against the sides 26 of the member 10.

Figure 28:
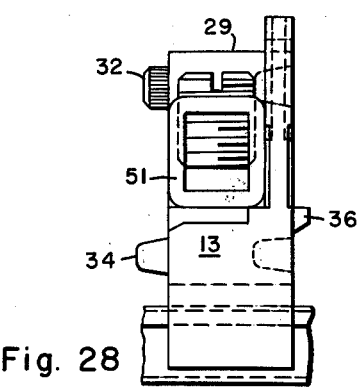
FIG. 28 is a view, in end elevation, of one of the terminal block sections with one of the terminal members shown in FIG. 19.
Figure 11:
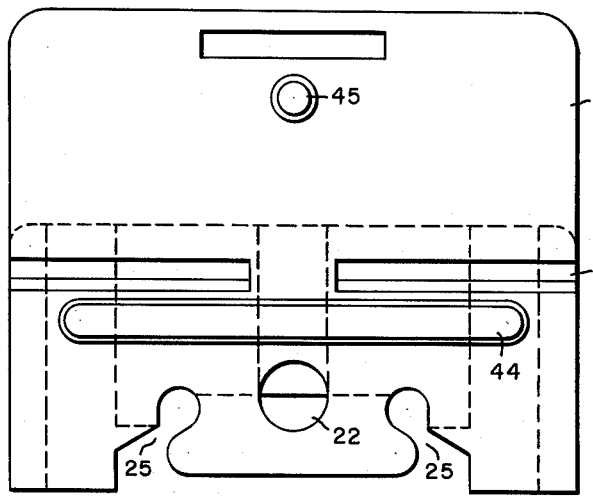
FIGS. 11, 12 and 13 are views in front, end, and rear elevation, respectively, of a right-hand end block for the assembly.
Figure 12:
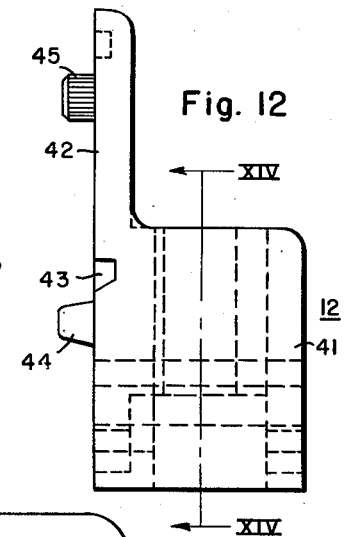
Figure 13:
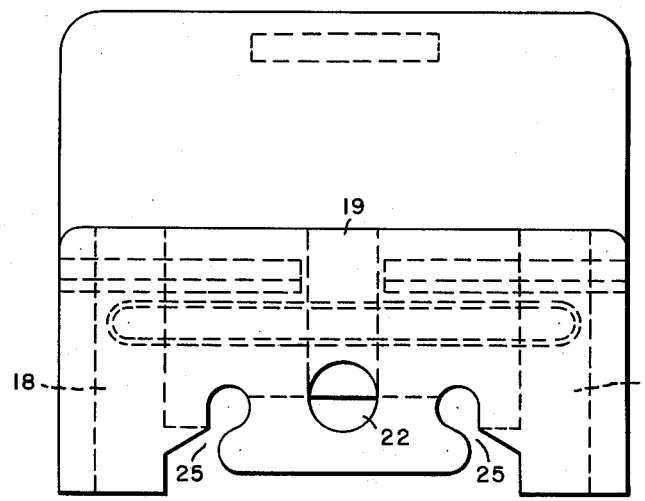
Figure 14:
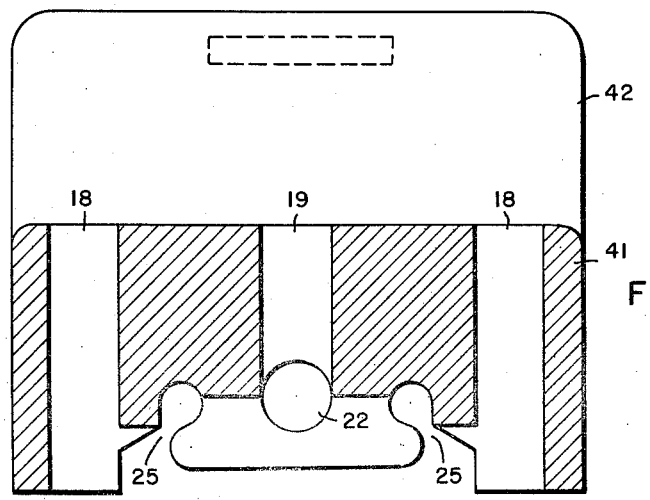
FIG. 14 is a view in section taken along the line XIV—XIV in FIG. 12.
Figure 19:
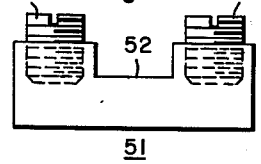
FIG. 19 is a view in side elevation of a terminal member of one type which may be utilized in the assembly.

As explained hereinbefore, terminal members of different types may be utilized with the terminal block sections. A terminal member 51 of one type is shown in FIG. 19. As shown in FIG. 28, the member 51 is generally square in cross section. A centrally disposed notch 52 is provided in the member 51. Terminal screws 53 are provided at the ends of the member 51.

Figure 20:
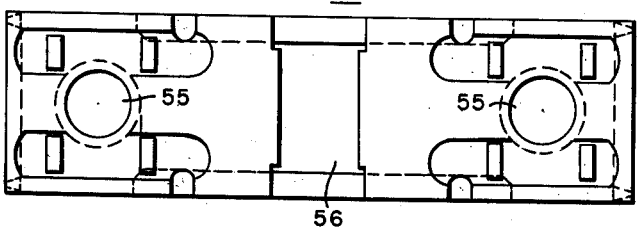
FIGS. 20, 21 and 22 are views in plan, side elevation and end elevation, respectively, of a terminal member of another type which may be utilized in the assembly.
Figure 21:
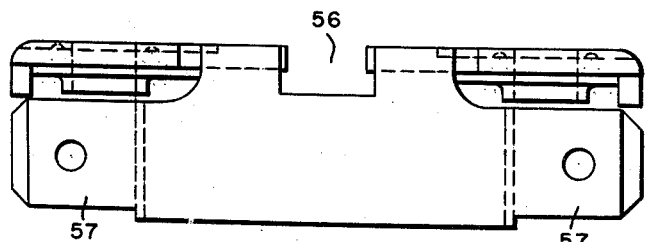
Figure 22:
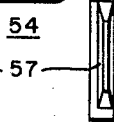

A terminal member 54 of another type is shown in FIGS. 20, 21, and 22. The member 54 is generally U-shaped in cross section. The member 54 is installed in an inverted position and the base of the member is provided with two threaded openings 55. A centrally disposed notch 56 is provided in the base. As shown most clearly in FIG. 21 each leg of the U-shaped member is provided with two end portions 57 which extend beyond the portion of the leg which is attached to the base of the terminal. Each end portion 57 is so shaped that a terminal connector 58 of the type shown in FIG. 1 may be pressed onto the end portion 57 and retained thereon by friction. In this manner a wire may be readily attached to each end portion 57 of the terminal member 54.

As also shown in FIG. 1, wires may be attached to the base of the terminal member 54. Thus, a wire may be attached to one end of the base by means of a clamp 59 and a terminal screw 61. Also wires may be attached to the other end of the base by means of terminal connectors 62 and a terminal screw 61. Thus, terminal connectors of different types may be utilized with the terminal member 54 to connect a plurality of wires to the same terminal member.

As also shown in FIG. 1 a wire may be connected to the terminal member 51 by means of the terminal screw 53. A plurality of wires may be attached to the other end of the terminal member 51 by means of terminal connectors 63 and the terminal screw 53. Thus, terminal connectors of different types may be utilized with the terminal members, and terminal members of different types may be utilized with the terminal block sections. Therefore, different numbers of wires or conductors of different sizes may be readily attached to the terminal blocks, thereby making the terminal blocks suitable for different applications.

Figure 27:
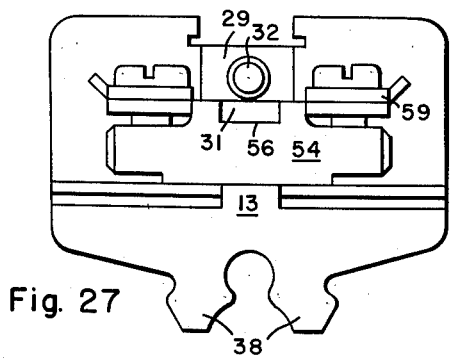
FIG. 27 is a view, in side elevation, of one of the terminal block sections with one of the terminal members shown in FIGS. 20, 21 and 22.

As shown in FIG. 27, the terminal member 54 is installed on the terminal section 13 by placing the member 54 in position with the projection 31 on the shelf 29 disposed in the notch 56 in the terminal member 54. Thus, the terminal member is prevented from moving longitudinally on the terminal section 13. When the terminal sections are assembled in the terminal block transverse movement of the terminal members is prevented by the barriers on the terminal sections and the end blocks.

Likewise, as shown in FIG. 28, the terminal member 51 is installed on the terminal section 13 with the projections 31 on the shelf 29 disposed in the notch 52 of the terminal member 51. In this manner longitudinal movement of the terminal member 51 is prevented and lateral movement is prevented by the barriers when the terminal sections are assembled in the terminal block assembly.

Figure 25:
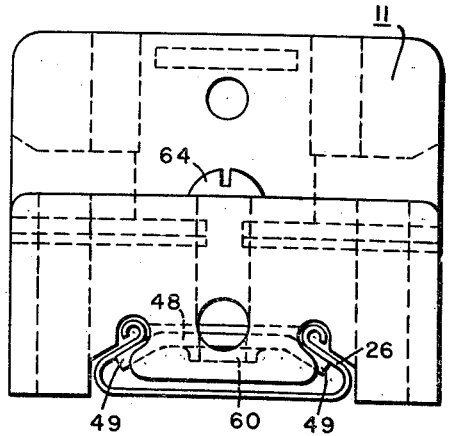

One or more terminal sections 13 may be assembled between the left-hand end block 11 and the right-hand end block 12 in the manner shown in FIG. 23. As shown, the interlocking projections and recesses on the terminal sections and the end blocks cooperate to retain the sections and the end blocks in position in the assembly. Thus, a projection 32 is disposed in an opening 17 or in a recess 33 and a projection 45 is disposed in a recess 33. Likewise, a projection 34 is disposed in a recess 24 or in a recess 35 and a projection 44 is disposed in a recess 35. Also, a projection 23 is disposed in a recess 37 and a projection 36 is disposed in a recess 37 or in a recess 43. As shown in FIG. 25, each end block may be attached to the supporting member 10 by means of the clamp 48 and the screw 64. The clamp 48 is disposed in the recess 21 in the block, see FIG. 6. The arms 49 of the clamp 48 are drawn against the angularly disposed sides 26 of the member 10 by means of the screw 64 which is disposed in the opening 19 in the end block. As previously explained the terminal sections are retained in position by the cooperation between the interlocking projections and recesses on the terminal sections and the end blocks.

Any one of the terminal sections may be removed from the terminal assembly with its terminal member by removing one end block as shown in FIG. 1. This is done by loosening the clamp 48 to permit the end block to be slid along the supporting member 10 in a plane parallel to the plane of the base of the end block. The terminal section is then slid along the supporting member 10 in a plane parallel to the base of the terminal section to disengage the interlocking projections and recesses on the terminal sections. The terminal section may then be moved in a plane parallel to the plane of the barrier to disengage the projections 38 on the terminal section from the curved edges 46 of the supporting members 10. The resiliency of the supporting member permits the projections 38 to be disengaged from the supporting member without it being necessary to rotate the terminal section about an axis perpendicular to the base of the terminal section as has been the case in terminal block assemblies of prior constructions. Thus, it is necessary to separate the terminal section only sufficiently to disengage the interlocking projections and recesses in order to remove a section from the terminal assembly.

Figure 26:
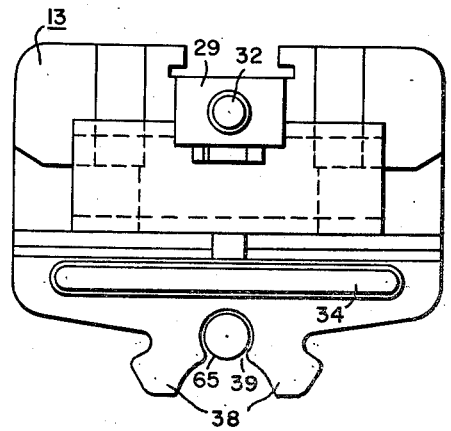
FIG. 26 is a view, in end elevation, of a terminal block section with a modified supporting member for the terminal blocks.

If it is not desired to utilize the channel-shaped supporting member 10, the terminal sections and the end blocks may be held together in the manner shown in FIG. 2 and FIG. 26. As shown in these figures, the end blocks 11 and 12 are held against the terminal sections by means of a rod 65 which extends through the openings 22 in the end blocks and through the recesses 39 in the terminal sections. The rod 65 may be threaded on each end to receive a nut 66. The end blocks may be attached to a suitable base or supporting member by means of screws 67 which extend through the openings 18 in the end blocks.

A terminal section may be removed from the assembly shown in FIG. 2 by removing one of the end blocks and then sliding the terminal section along the rod 65 to disengage the interlocking projections and recesses on the terminal sections. The terminal section may then be removed by disengaging the projections 38 from the rod 65. There is sufficient resiliency of the projecting portions 38 to permit them to be disengaged from the rod 65 by moving the terminal section in a plane parallel to the barrier portion of the section.

From the foregoing description it is apparent that the invention provides a multiple terminal block assembly which may be mounted in a switchboard or other structure in different manners. The terminal block may be assembled with any desired number of terminal sections in the assembly. Any one of the sections may be removed from the assembly without removing the other sections from the assembly. Terminal members of different types and terminal connectors of different types may be utilized with the terminal sections. Thus, different numbers of wires and different sizes of wires may be readily attached to the terminal block. Therefore, the terminal block assembly is suitable for different applications.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a multiple terminal block assembly, in combination, a plurality of terminal block sections assembled in side-by-side relation, each section comprising a base and a barrier perpendicular to the base, an end block at each end of the assembly, supporting means for said sections and said end blocks, a terminal member on each section, each section having two spaced downwardly extending projections thereon for releasably engaging said supporting means, complementary recessed and projecting portions on opposite sides of each section for interlocking said sections, a clamp on each end block for retaining it on said supporting means, and each section being removable with its terminal member from the assembly by first releasing the clamp on one end block then sliding the section and the end block along the supporting means parallel to the plane of the base to disengage said recessed and projecting interlocking portions and then moving the section in a direction parallel to the plane of the barrier to disengage said spaced projections from the supporting means.

2. In a multiple terminal block assembly, in combination, a plurality of terminal block sections assembled in side-by-side relation, each section comprising a base and a barrier perpendicular to the base, complementary recessed and projecting portions on opposite sides of each section for interlocking said sections, an end block at each end of the assembly, generally channel-shaped supporting means for said sections and said end blocks, said supporting means having inturned sides, a terminal member on each section, each section having two spaced downwardly extending projections thereon for releasably engaging the sides of said supporting means, clamping means disposed within the confines of each end block for retaining the end blocks on the supporting means by engaging the sides of the supporting means, and each section being removable with its terminal member from the assembly by releasing said clamping means to release an end block then sliding the section and the end block along the supporting means to disengage said interlocking portions and then moving the section in a direction parallel to the plane of the barrier to disengage the section from the supporting means.

3. In a multiple terminal block assembly, in combination, a plurality of terminal block sections assembled in side-by-side relation, each section comprising a base and a barrier perpendicular to the base, complementary recessed and projecting portions on opposite sides of each section for interlocking said sections, an end block at each end of the assembly, a shelf on the barrier parallel to the base and spaced from the base, a reversed U-shaped terminal member on each section between the shelf and the base, the legs and the connecting base of the terminal member being available for attaching terminal connectors thereto, supporting means for said sections and said end blocks, a clamp on each end block for retaining it on the supporting means, each section having two spaced downwardly extending projections thereon for releasably engaging said supporting means, and each section being removable with its terminal member from the assembly by first releasing the clamp on one end block then sliding the section and the end block along the supporting means to disengage the interlocking portions and then disengaging said spaced projections from the supporting means without rotating the section about an axis perpendicular to its base.

4. In a multiple terminal block assembly, in combination, a plurality of terminal block sections assembled in side-by-side relation, each section comprising a base and a barrier perpendicular to the base, complementary recessed and projecting portions on opposite sides of each section for interlocking said sections, an end block at each end of the assembly, a shelf on the barrier parallel to the base and spaced from the base, a generally U-shaped terminal member on each section between the shelf and the base, both legs and the connecting base of the terminal member being adapted for attaching terminal connectors thereto, supporting means for said sections and said end blocks, a clamp on each end block for retaining it on the supporting means, each section having two spaced downwardly extending projections thereon for releasably engaging said supporting means, and each section being removable with its terminal member from the assembly by first releasing the clamp on one end block then moving the section and the end block in a direction parallel to the plane of the base to disengage said interlocking portions and then moving the section in a direction parallel to the plane of the barrier to disengage said projections from the supporting means.

References Cited in the file of this patent

UNITED STATES PATENTS

| 1,936,963 | Dutzmann | Nov. 28, 1933 |
| 2,397,102 | Graham | Mar. 26, 1946 |
| 2,623,087 | Latta | Dec. 23, 1952 |

FOREIGN PATENTS

| 792,298 | Great Britain | Mar. 26, 1958 |

OTHER REFERENCES

Electronic Design for October 29, 1958, page 8.